UNITED STATES PATENT OFFICE.

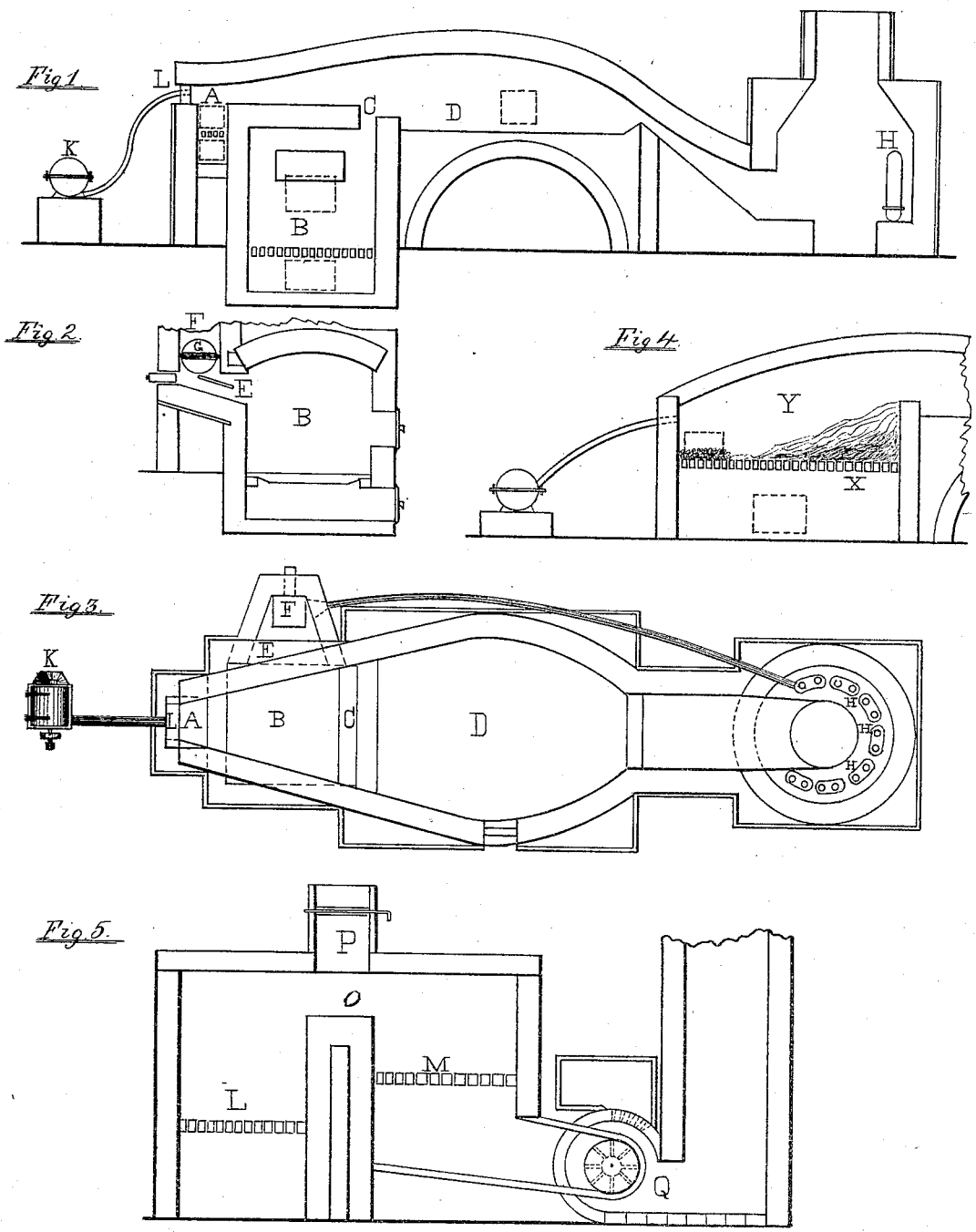

JACOB J. STORER, OF BOSTON, MASSACHUSETTS.

IMPROVEMENT IN APPARATUS AND PROCESSES FOR DEODORIZING AND TREATING OFFAL.

Specification forming part of Letters Patent No. 131,131, dated September 3, 1872.

*To all whom it may concern:*

Be it known that I, JACOB J. STORER, of Boston, in the county of Suffolk and State of Massachusetts, have invented a new and useful Improvement in Deodorizing Furnaces and Processes, which the following specification and accompanying drawing sufficiently describe.

The object of my invention is to dispose of the refuse animal matter of slaughtering, rendering, bone-boiling, and other like establishments in such a way that no offensive or noxious odors or gases shall escape into the air.

For this purpose I construct a reverberatory furnace, preferably like that patented by James D. Whelpley and Jacob J. Storer in the United States Patent Office, No. 109,785, dated November 29, 1870, and attach to it an auxiliary fire-place. My plan is to burn or dry the refuse animal matter, and to decompose or deodorize the resulting gases by subjecting them to a high temperature and a contact or mingling with coke or coal, and, in some instances, also with sulphurous gas.

The drawing shows one form of furnace which I have used for this purpose. Fires are built in the auxiliary fire-place A, and in the main fire-place or gas-generator B, and urged until the fire-places and surrounding brick-work have become well heated. Pulverized coal with air is then injected by the pulverizer or blower K through the slot or opening L in the rear of the furnace. This jet of pulverized fuel is ignited by the heat from the auxiliary fire-place, and, moving forward, burns in the body of the furnace D, quickly raising it to a high temperature. The refuse animal matter is then introduced upon the fire in the gas-generator B. The steam and gases arising from it as it dries or burns escape by the slot or opening C, and moving forward into the body of the furnace and mingling with the burning gases and powdered coke of the pulverized fuel, become deodorized or decomposed so that the gases passing off through the smoke-stack give no disagreeable odor. This animal refuse, as it comes from the rendering-tanks or vats is usually very wet, and has so offensive an odor that it is desirable to introduce it into the furnace with as little manipulation as possible; therefore I build a drying-slope or feed-port, E, attached to the furnace, into which the material may be conveyed directly through a hopper from the tank. A hopper, F, to hold any desired quantity of this material, may be built above this feed-port or slope, and a damper or slide, G, may be made to regulate the supply to the furnace. The material as it slides or moves down the drying-slope is partially dried by the heat of the generator; but I find it advantageous to force hot air upon it through the hot-air pipes H H, which are heated by the waste heat of the furnace. The auxiliary fire-place, though most convenient and suitable, is not necessary to the proper action of the furnace or success of the process. An ordinary fire-place would serve the same purpose if a section of it were reserved for the fuel with which to ignite the jet of pulverized fuel, while the rest is devoted to the burning or drying of the animal matter, as shown in Fig. 4, in which X is that part of the grate on which coal or other fuel is burned for the purpose of igniting the jet of pulverized fuel; and Y is that portion intended for the burning or drying of animal matter.

Fig. 5 shows another style of furnace and apparatus which I have also successfully used to accomplish the desired purpose. Deep coal-fires are made in the two fire-boxes L and M, and urged in the usual way until they and the connecting-tube O reach a bright red heat, the smoke and gases from these fires passing off through the opening P. As soon as this furnace has reached a proper temperature the opening at P is closed, and the exhaust and spray-wheel Q (invented and patented in United States Patent Office by James D. Whelpley and Jacob J. Storer, No. 53,068, dated March, 6, 1866,) put in motion, so that the usual upward draft is maintained in fire-place L, a horizontal draft in the connection O, and a downward draft through the burning coals in fire-place M. The refuse animal matter is then introduced upon the fire in L, which is urged by a blast, and the escaping offensive gases, passing along the heated flue O and down through burning coals in M, are rendered inodorous and innocuous. The grate-bars in M are preferably made of fire-brick, perforated brick slabs, or iron tubes with water or air circulating through them, the object being to have a grate that will best endure the intense heat of the downward flame. The exhaust and spray-wheel may be substituted by a smoke-stack with powerful draft.

To accomplish the desired result a furnace with two or more fire-places may be used, the animal matter to be burned or dried being placed in one fire-place, and the resulting gases being made to meet and mix with the gases, smoke, and flame arising from the other or others.

I am aware that a process has been patented for rendering the offensive gases inodorous by passing them through a coil of highly-heated tubes. One objection to this method, in point of economy, is the rapid destruction of the tubes by passing through them, when heated, the steam and gases arising from burning or drying animal matter. Another objection is, that the volume of steam and gases may, at different periods of the process, easily be in excess of the operating capacity of the tubes, or the fire which heats them may at times fail to keep them at their proper operating temperature. In either case considerable portions of the offensive gases must escape without being deodorized. On the other hand my process has the advantage of economy and thoroughness. The offensive gases are deodorized so far as may be by the intense heat of the furnace, and are mixed with or infiltrated through glowing coke and coal, (wood or bone charcoal, which are among the best deodorizers, may be injected into furnace, Plate I, as pulverized fuel, or laid in a mass for filtering above the coals in N, Plate II,) and are mingled with the sulphurous gases given off by the burning coal, so that any portion of the offensive gases failing to become deodorized by the heat (which will vary considerably during the process) will be made entirely inoffensive by their intimate mixture with two of the most powerful deodorizers.

When it is desired to dry and not to burn the offensive animal matter, a retort, chamber, or tank of metal or brick, with opening for escape of the gases and steam, is substituted for the fire-place or generator, the escaping steam and gases being deodorized as herein described, and said retort, chamber, or tank is heated by application of fire to its outer surface.

Having thus described my apparatus and process, what I claim is—

1. The modification or improvement of the Whelpley and Storer furnace and apparatus for the application of pulverized fuel, by addition of an auxiliary fire-place, in the manner and for the purpose substantially as described.

2. A furnace with two fire-places, with a connecting flue or conductor—one fire-place serving for the burning, drying, or distillation of the material, and the other for the deodorizing of the gases arising therefrom.

3. Deodorizing offensive gases by passing them through or into a heated furnace, fire-place, chamber, or flue, and bringing them in contact or mixture with coke, charcoal, or coal, substantially as described.

4. Deodorizing offensive gases by passing them through a heated furnace, fire-place, chamber, or flue, and bringing them in contact with coke, charcoal, or coal and sulphurous gas, substantially as described.

JACOB J. STORER.

Witnesses:
CHAS. M. NICKERSON,
THOS. H. RUSSELL.